United States Patent [19]

Minowa

[11] 4,409,600

[45] Oct. 11, 1983

[54] THERMAL PRINTER DRIVE CIRCUIT

[75] Inventor: Masahiro Minowa, Shiojiri, Japan

[73] Assignee: Epson Corporation, Nagano, Japan

[21] Appl. No.: 334,757

[22] Filed: Dec. 28, 1981

[30] Foreign Application Priority Data

Dec. 29, 1980 [JP] Japan ............................... 55-187626

[51] Int. Cl.[3] .......................... G01D 15/10; B41J 3/20

[52] U.S. Cl. ................................ 346/76 PH; 219/216

[58] Field of Search ................ 400/120; 219/216 PH; 346/76 PH

[56] References Cited

U.S. PATENT DOCUMENTS

| | | | |
|---|---|---|---|
| 3,577,137 | 5/1971 | Brennan | 346/76 PH |
| 3,934,695 | 1/1976 | Kovalick | 400/120 |
| 4,113,391 | 9/1978 | Minowa | 400/120 |
| 4,262,188 | 4/1981 | Beach | 219/216 PH |
| 4,268,838 | 5/1981 | Nakano et al. | 346/76 PH |

FOREIGN PATENT DOCUMENTS

| | | | |
|---|---|---|---|
| 53-6045 | 1/1978 | Japan | 400/120 |

*Primary Examiner*—Donald A. Griffin

[57] ABSTRACT

A drive circuit for a thermal printer having plural heat generating elements which are selectively energized comprising a current device controlling application of current to the heat generating means. The drive circuit also includes a current application time control circuit for varying the period of time during which current flows to the heat generating elements. Dot printing is produced with constant power and constant temperature over a wide range of power supply voltage variations. The time control circuit includes a charging circuit having a capacitor, and a discharging circuit connected in parallel. The charging circuit is inserted between the power supply terminals and includes a constant voltage component. A switching circuit operates in response to the level of charge on the capacitor to control the application of current to the heat generating means.

13 Claims, 12 Drawing Figures

FIG. 1
PRIOR ART
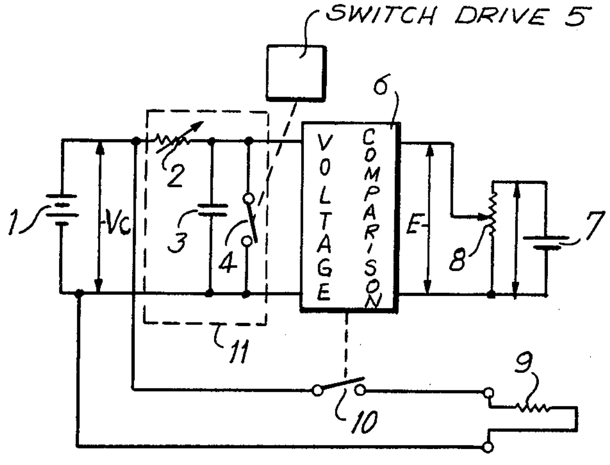
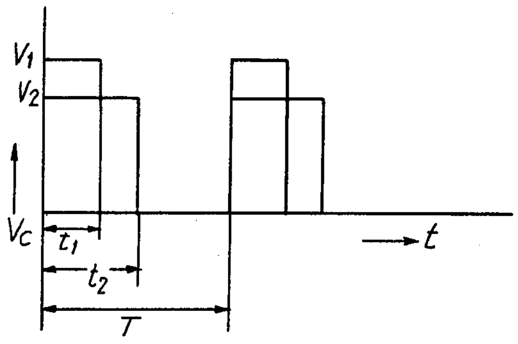
FIG. 2
PRIOR ART

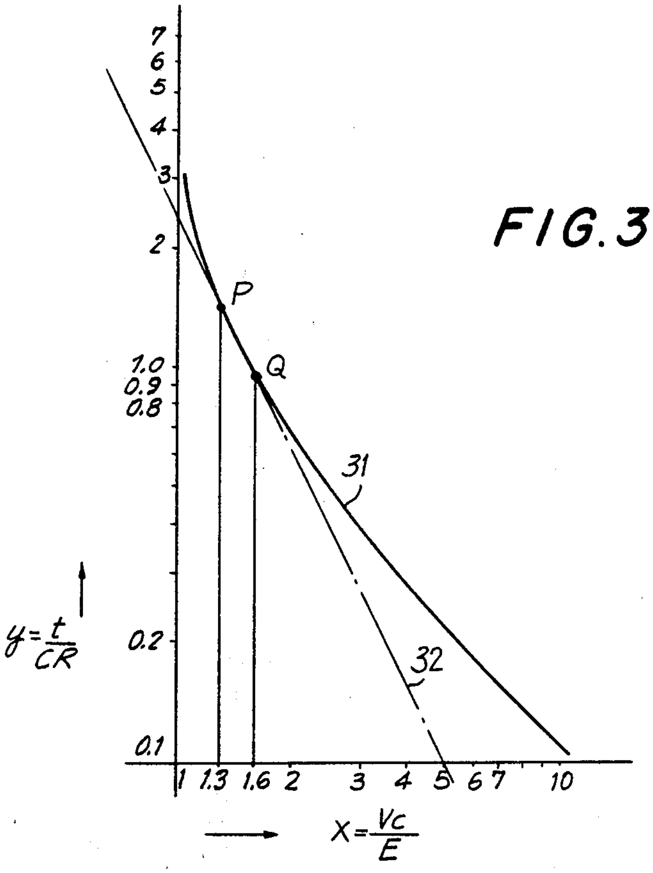
FIG. 3
FIG. 5
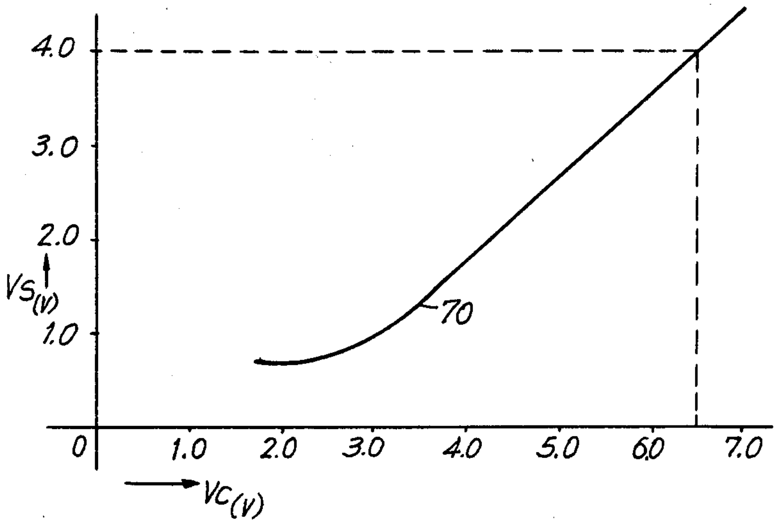

FIG. 6
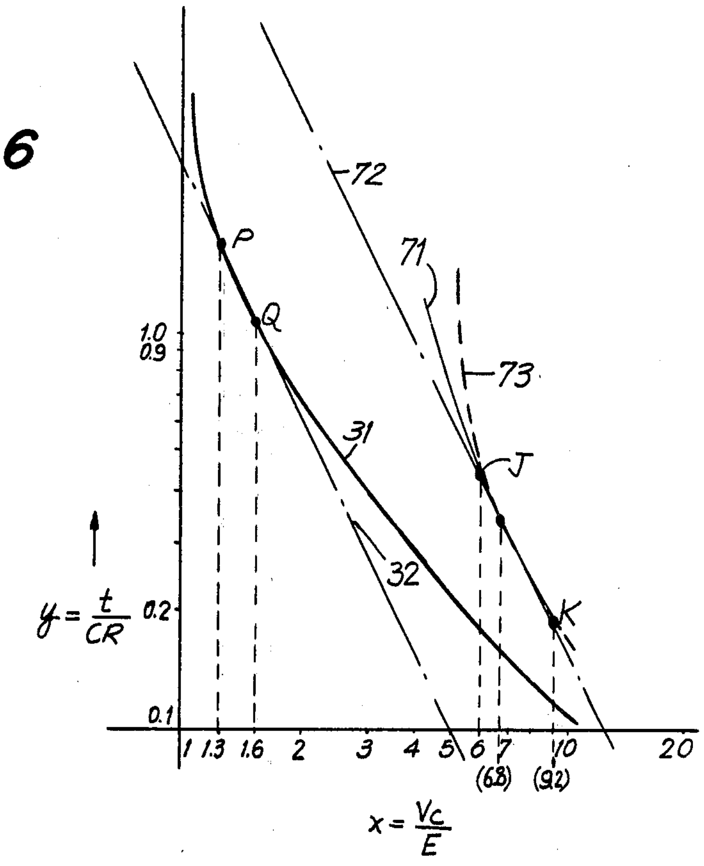
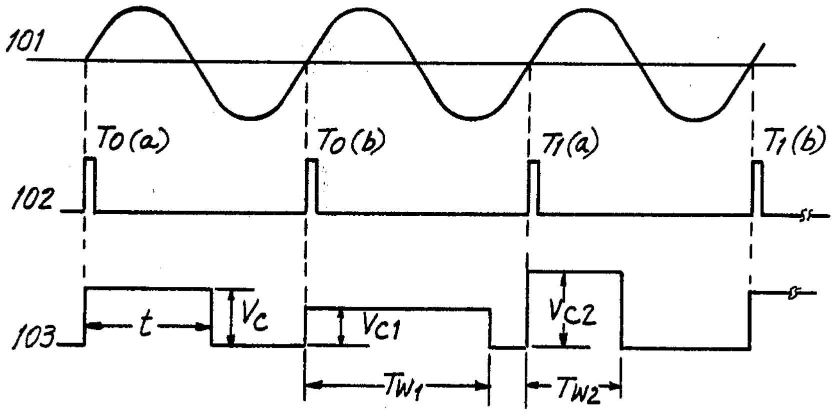
FIG. 8

THERMAL PRINTER DRIVE CIRCUIT

BACKGROUND OF THE INVENTION

This invention relates generally to a thermal printer drive circuit and more particularly to a thermal printer drive circuit which operates from batteries and provides a uniformly high quality of printing from a print head having a plurality of thermal pens. To effect thermal printing, the thermal pen is energized for short periods of time. The heat generating elements must be heated to a predetermined temperature for every activation in order to obtain a stable printing quality. Constant temperature conditions are provided at the thermal pen when the energy dissipated is maintained constant, that is, an equal energy or equal temperature characteristic is provided.

In a multiple pen printer, the drain on the power supply battery varies depending upon the number of pens simultaneously in operation and this number varies when the print head is used to print characters with dots in a matrix, for example, a matrix of five by seven dots. When many pens operate simultaneously, the internal resistance of the battery causes a voltage drop, and battery aging also can cause a voltage drop. When the supply voltage drops, the heating current must be applied to the thermal pen for a longer time period in order to maintain the equal energy/equal temperature characteristic. In the prior art it has only been possible to provide a thermal printer drive circuit which satisfies the equal temperature characteristic over a narrow range of voltage variations.

Beyond that narrow range, at both higher and lower voltages, excessive energy is provided to the thermal pens. This is not suitable for controlling heating generating units such as the heat generating elements of the thermal printer. These components are easily subject to damage. This disadvantage may be overcome by using a constant voltage circuit for driving the thermal printer head. However, this has a disadvantage in that when using a battery as a power source, power consumption in the constant voltage circuit is quite large in itself. Thus, this approach is not suitable for driving a thermal printer operating on batteries. Accordingly, such a thermal printer drive circuit is not well adapted to a thermal printer having a large plurality of thermal pens, many of which may be required to operate simultaneously.

What is needed is a thermal printer drive circuit suitable for use with a thermal print head having a large plurality of thermal pens, and printing with high quality resulting from a constant temperature/constant energy characteristic.

SUMMARY OF THE INVENTION

Generally speaking, in accordance with the invention, a thermal printer drive circuit especially suitable for a multiple pen thermal printer head is provided. The drive circuit provides current to the thermal pens for variable durations of time in accordance with the level of voltage in the battery supply, such that constant energy is always provided for printing dots on a printing medium. The constant energy input for each dot provides a constant temperature at the pen and uniform print quality. The duration of time for application of current to the pens is controlled by a resistive-capacitive charging circuit which also includes a constant voltage means. Inclusion of the constant voltage means in the charging circuit expands the range of battery voltages wherein the constant temperature-constant energy characteristic is satisfied.

In an alternative embodiment, two charging pens are provided, the second path not including a constant voltage means. Either constant voltage path is used selectively with indifferent battery voltage ranges so that the overall battery range which provides constant power/constant energy for printing is further expanded.

Accordingly, it is an object of this invention to provide an improved thermal printer drive circuit suitable for driving a multiple pen thermal printer head and providing high quality printing.

Another object of this invention is to provide an improved thermal printer drive circuit which satisfies the constant energy/constant temperature characteristics for thermal printing in a print head having a large plurality of thermal pens.

A further object of this invention is to provide a thermal printer drive circuit which satisfies the constant temperature/constant energy characteristic for a multiple thermal pen printer operating on a battery supply having wide variations in output voltage.

Still another object of this invention is to provide a thermal printer drive circuit which drives the thermal pens of a thermal printer for a time period which is inversely related to the voltage of the power supply, thereby satisfying the constant temperature/constant energy characteristic and providing high quality printing.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a partial circuit for constant temperature control of a thermal pen of the prior art;

FIG. 2 is a chart showing the relationship between supply voltage and heating time for a thermal pen of FIG. 1;

FIG. 3 is a graph indicating the performance characteristics of the circuit of FIG. 1;

FIG. 5 is a graph indicating relationships between supply voltage and the voltage at a circuit point in FIG. 4;

FIG. 6 is a graph similar to FIG. 3 indicating the performance characteristics of the circuits of FIGS. 1 and 4;

FIG. 8 is a chart of timing signals associated with the operation of the circuit of FIG. 7;

DESCRIPTION OF THE PREFERRED EMBODIMENTS

Figure 4:
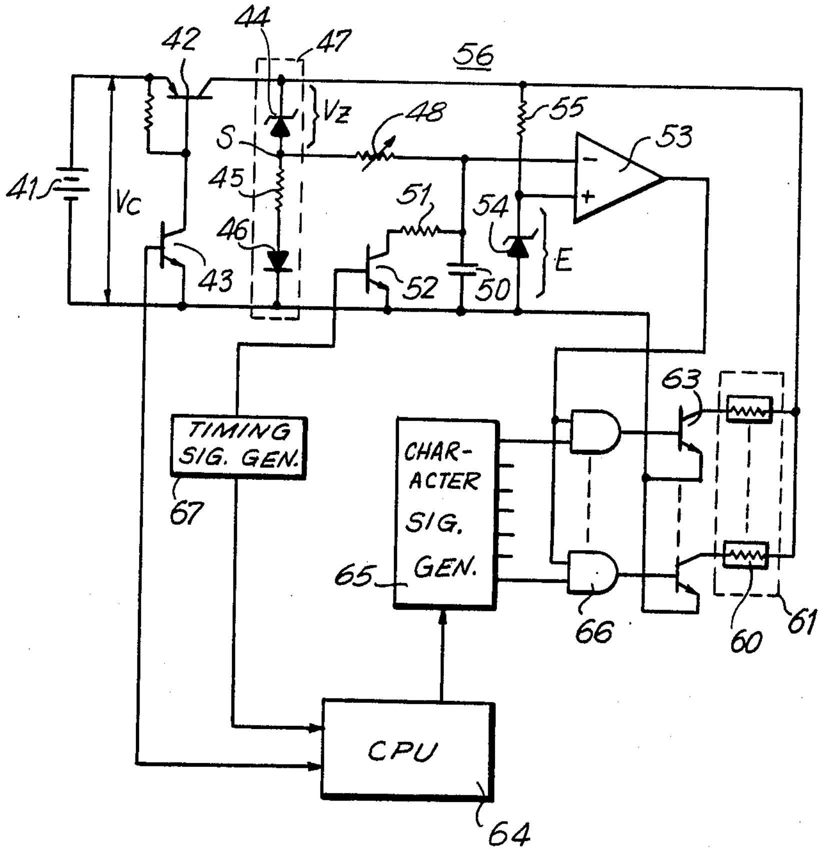
FIG. 4 is a circuit diagram of a thermal printer drive circuit in accordance with this invention.

This invention relates to a thermal printer drive circuit. FIG. 1 shows a portion of a constant temperature control circuit for a thermal pen of the prior art which has been disclosed in Japanese patent application, Publication No. 15378/1978. With some modifications, a circuit similar to FIG. 1 can be applied to a thermal printer. However, such a circuit has several disadvantages as described hereinafter. The circuit of FIG. 1 includes a power source 1 such as a battery having an output which varies with time. The circuit also includes a variable resistor 2 and a capacitor 3. The capacitor 3 is connected to the power source 1 through the resistor 2. A switch 4 connects in parallel across the capacitor 3 and these three elements, the resistor 2, capacitor 3 and switch 4 form a charge-discharge circuit 11.

Further, the circuit of FIG. 1 includes a switch drive circuit 5 for operating, that is, opening and closing, the switch 4 at predetermined time intervals. Also included are a voltage comparison circuit 6, a reference power source 7, a variable voltage divider 8, a thermal pen 9 acting as a resistor circuit, and a switch 10 in series with the thermal pen 9. The switch 10 is turned on and off by the output of the voltage comparison circuit 6 so as to maintain the temperature of the thermal pen 9 at a constant level regardless of variations in the supply voltage Vc.

In order to apply the circuit of FIG. 1 to a thermal printer having a plurality of thermal pens, it is necessary to increase the number of heat generating elements in the circuit corresponding to the thermal pen 9 and to provide a circuit for selectively controlling a switch 10 associated with each pen. However, the operating principle that the heat generating elements be heated to a predetermined temperature so as to obtain a stable printing quality is equally applicable to the thermal printer having a multiple of pens as to a single pen circuit of FIG. 1.

In operation, the capacitor 3 is discharged by momentary turning on of the switch 4. The period of time t required for charging the capacitor 3 to a voltage level E, which level E is obtained by applying the voltage of the reference power source 7 to the variable voltage divider 8, is detected by means of the voltage comparison circuit 6. That is, when the capacitor 3 has charged to a level of voltage E as determined by the voltage comparison circuit 6, the switch 10 which has been closed while the capacitor 3 charges, is opened. Thus, the switch 10 is closed and the thermal pen 9 is heated for the period of time t. This provides operation of the thermal pen 9 at a preselected temperature level, and the thermal pen 9 is operated at preselected regular intervals having a period T greater than t.

FIG. 2 illustrates the variations in the heating period time t relative to variations of the supply voltage Vc. As is apparent from FIG. 2, when the supply voltage Vc is at a high level as indicated by $V_1$, the charging time of the capacitor 3 is short and accordingly, the heating period is short as indicated by the interval $t_1$. When the supply voltage Vc is low as indicated by $V_2$, the charging time $t_2$ is long. The pen 9 is indicated to operate at intervals having a period T, as stated.

If the resistance of the thermal pen 9 is represented by r, then energy per unit of time $P_W$ applied to the thermal pen can be represented by the following expression (1):

$$P_W = \frac{Vc^2}{r} \times \frac{t}{T} \tag{1}$$

In order to make the temperature constant for each operation of the pen, the energy must be maintained constant. In this case the relationship between time t and supply voltage Vc is as follows:

$$t \sim 1/Vc^2 \quad \ldots (2)$$

This relationship (2) is the equal energy or equal temperature characteristic.

If the capacitor 3 and the resistor 2 are represented by C and R respectively, then the heating period of time t can be represented by the following expression (3):

$$t = -C \cdot R \ln (1 - E/Vc) \quad \ldots (3)$$

FIG. 3 is a logarithm—logarithm graph with Vc/E on the x-axis and with t/CR as the y-axis. In FIG. 3 a characteristic curve 31 is obtained by dividing the expression (3) by CR. A straight line 32 having a slope of −2, which corresponds to the equal energy/equal temperature characteristic (2) is also shown. The locus of a point which is on a straight line having a slope of −2 can be represented by the following relationship (4):

$$Y = \alpha \frac{1}{x^2} \tag{4}$$

where $\alpha$ is a constant.

That is, the relationship (2) of t and Vc of the equal temperature characteristic is equivalent to the relationship (4). The temperature is maintained constant for each printed dot in that portion of the curve 31 which is parallel or coincident with a line having the slope of −2.

As seen in FIG. 3, a portion of the characteristic curve 31, from point P to point Q is substantially parallel with, and as illustrated, substantially coincident with the straight line 32. This parallel/coincident portion is in the range of 1.3 to 1.6 in terms of the x value of the abscissa. For the sake of an example, it is assumed that the power source has four manganese dry cells and in such a case, the initial value of Vc is approximately 6.5 volts. When x is 1.6, the value of E is calculated to be 4.06 volts. With E defined as a constant reference, then when x equals 1.3, the value of Vc is approximately 5.3 volts. Thus, it can be seen that the equal temperature/constant power drive is accomplished with the circuit of FIG. 1. Powered by the four cells, as stated above, the circuit will provide constant temperature, high quality printing in a narrow range of voltage Vc from 5.3 to 6.5 volts.

In general, the manganese dry cell, for example, SUM-3, has an internal resistance of approximately 0.5 ohms. Therefore, in an application as in a thermal printer, where a plurality of heat generating elements each corresponding to the thermal pen 9 are simultaneously driven with current, the voltage from the dry cells drops considerably. Therefore, it is necessary to use a circuit which shows the equal energy characteristic over a much wider range of voltage than the circuit of FIG. 1 described above. In a system, such as a thermal printer, wherein the energy is converted instantaneously into heat to form dots, even a small energy difference greatly affects the printing quality. Accordingly, an extended performance characteristic close to the straight line 32 or parallel thereto, is required.

FIG. 4 is a circuit diagram of a thermal printer drive circuit in accordance with the invention which is suitable for application in an electronic desk calculator operating from batteries. The thermal printer drive circuit of FIG. 4 includes a battery 41 as a power source, a transistor 42 which is a type of switching means for supplying current to the circuit, a transistor 43 for controlling the ON/OFF operation of the transistor 42. The transistor 42 is non-conductive, that is, OFF when the thermal printer is not in operation. The circuit also includes a first constant voltage means 44, which in this embodiment (FIG. 4) is a Zener diode, a resistor 45, and a diode 46. The Zener diode 44, the resistor 45 and the diode 46 form a voltage division circuit 47 for dividing the supply voltage Vc.

The capacitor 50 is connected through an adjusting resistor 48 between a circuit point S, which is an optional voltage division point of the voltage division circuit 47, and the power source negative terminal. A discharge circuit comprises a protective resistor 51 in series with the emitter-collector of a transistor 52, which are connected in parallel across the capacitor 50. The voltage at point S is represented as Vs hereinafter.

A voltage comparison circuit 53 is a type of switching circuit which is turned ON and OFF according to the level of charge stored in the capacitor 50. A reference voltage E is provided by a series circuit of a Zener diode 54 and a resistor 55 in series. The reference voltage E and the voltage level of the capacitor 50 are subjected to comparison in the voltage comparison circuit 53. In accordance with the result of the comparison, the output of the voltage comparison circuit 53 is changed. When the capacitor 50 is discharged, the output of the comparison circuit 53 is high, but when the charged level of the capacitor 50 reaches a value of voltage E, the output of the voltage comparison circuit 53 is set to a low logic level. The period of time t for applying current to the heat generating elements of the thermal printer is determined in accordance with the supply voltage value Vc. The circuit comprising the current application time control circuit as described heretofore with reference to FIG. 4 is generally indicated by the reference numeral 56.

Further, the circuit of FIG. 4 includes a plurality of heat generating elements 60, or pens, a heat generating head 61 made of ceramic material and incorporating the heat generating elements 60. In general, characters are formed with dots in a 5×7 matrix by moving the heat generating head 61 laterally, the head having an array of heat generating elements 60 corresponding to 7 dots arranged longitudinally. During this operation, the transistor 63 associated with each heat generating element 60 is used to control the application of current to the individual heat generating element 60 so as to form the desired characters.

A central processing unit 64 (CPU) performs processing operations and controls the printer, and a character signal generating unit 65 is coupled to the central processing unit. In construction where a microprocessor is employed as the central processing unit, in general, an input/output port (IO) is used. When a high output of the character signal generating unit 65 and a high output of the voltage comparison circuit 53 are applied to AND gate means 66, transistor means 63 are rendered conductive for a period of time t which corresponds in duration to the level of voltage Vc at the voltage supply 41. As a result, printing is carried out with suitable density and quality as the capacitor 50 charges to a voltage level which is equal to the voltage level E. A timing signal generating unit 67 is provided to detect the physical location of the heat generating head 61, and thereby to generate printing timing signals which are used to render the discharging transistor 52 conductive momentarily. Turning on of the transistor 52 discharges the capacitor 50 and allows the print cycle to be repeated. The necessary discharge time is in the order of several tens of microseconds.

The operation and performance characteristics of the current application time control circuit 56 of FIG. 4 is described with reference to FIGS. 5 and 6. FIG. 5 indicates the variation of the potential Vs at the circuit point S in relationship to variations of the supply voltage Vc. The Zener diode 44 has the maximum Zener voltage $V_Z$ of 2.5 volts, as an example. The diode 46 is a silicon diode having a maximum voltage of about 0.7 volts. The forward voltage of the diode 46 barely changes even when the supply voltage Vc is decreased and the current flowing through the diode 46 is decreased. Therefore, a characteristic curve 70 (FIG. 5) is obtained. The potential Vs at the point S is the actual potential for charging of the capacitor 50. In the situation where the voltage Vc decreases to approximately four volts, the potential at the point S can be approximated by the following expression (5):

$$Vs = Vc - Vz \qquad \ldots (5)$$

The output pulse width t from the voltage comparison circuit 53 is represented by the following expression (6):

$$t = -CR\ln\left(1 - \frac{E}{Vc - Vz}\right) \qquad (6)$$

Where C is the capacitance of the capacitor 50 and R is the resistance of the adjusting resistor 48. It should be noted that the output pulse width t is substantially represented by the expression (6) in a construction where the diode 46 is omitted. However, the pulse width t is represented by the following expression (7) in a construction where the diode 46 is not omitted:

$$t = -CR\ln\left(1 - \frac{E}{Vs}\right) \qquad (7)$$

FIG. 6 is a graph with logarithmic scales indicating the relationships between the output pulse width t of the current application time control circuit 56 and the supply voltage Vc. The scales are the same as those used in FIG. 3 and the curves 31,32 of FIG. 3 are also shown in FIG. 6. In particular, FIG. 6 shows performance characteristic curves which are drawn with values of y which are experimentally obtained from actual charging potentials Vs where x=Vc/E. For example, the reference voltage E is 0.7 volts. In FIGS. 6 and 3, like items are designated with the same reference numerals.

In FIG. 6, the curve 71 indicates the performance characteristic of the current application time control circuit 56 using the voltage division circuit 47. A portion of the characteristic curve 71 from the point J to the point K is parallel with a straight line 72 having a slope of −2. This portion of the curve 71, which corresponds to a range of values of x from 6.0 to 9.2, provides the desired constant power/constant temperature characteristic. In terms of supply voltage Vc, because Vc equals xE, the desired range corresponds to values of Vc from 3.6 to 6.4 volts. This means that the equal energy characteristic range is greatly increased as compared with that of the conventional circuit (curve 31). In other words, even when the capacity of the power source 41 is decreased and accordingly, the voltage output Vc is decreased, power is properly applied to the heat generating elements 60 and printing is carried out with suitable density over a wide range of voltage.

A characteristic curve 73, indicated with broken lines in FIG. 6, is produced where the diode 46, which is a second constant voltage means, is omitted from the voltage division circuit 47. A portion of the characteristic curve 73, corresponding to a range of x from 6.8 to 9.2, is substantially coincident or parallel to the straight line 72 having the slope −2. Therefore, the applicable cable range of voltage Vc giving the desired constant energy performance is wider than that provided by the characteristic curve 31. This characteristic curve 73 is sufficient for a dry cell such as a nickel-cadmium dry cell having a relatively small voltage variation range.

In an alternative embodiment, the circuit 56 is modified such that the resistor 45 is omitted, and the series circuit of the first constant voltage means 44, the adjusting resistor 48 and a capacitor 50 is connected to the power source. With this modification, a characteristic curve substantially similar to the characteristic curve 73 is obtained.

Thus, the thermal printer drive circuit in accordance with the invention has the strong advantage that, as the current application time t is increased in accordance with the variations of the supply voltage Vc, the power is economically consumed at the desired level and print quality is high at all times over a range of supply voltages.

Figure 7:
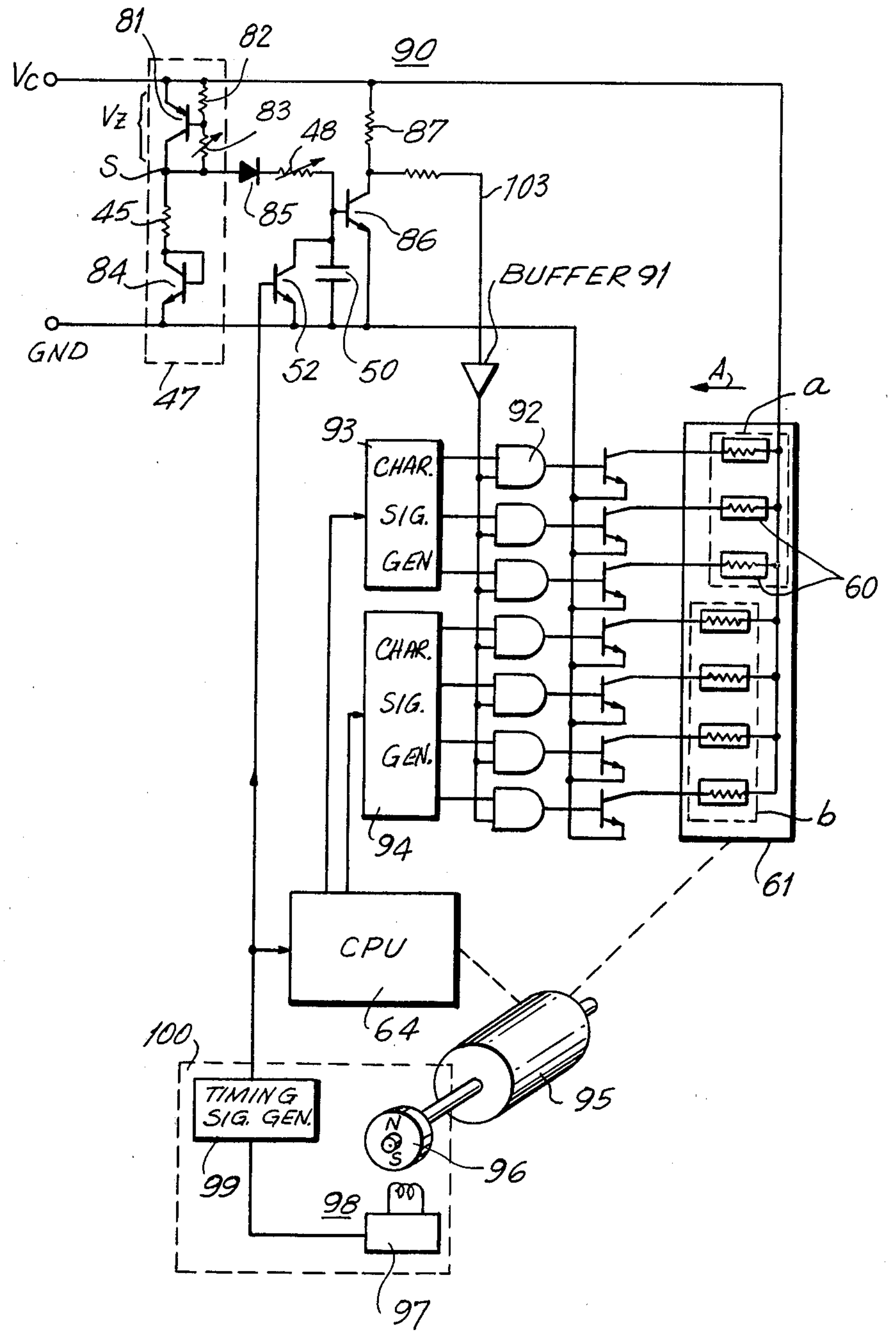
FIG. 7 is curcuit of an electronic desk calculator utilizing an alternative embodiment of a thermal printer drive circuit in accordance with the invention.

FIG. 7 is a circuit diagram of an electronic desk calculator using an alternative embodiment of the thermal printer drive circuit in accordance with the invention. In FIGS. 4 and 7, like components and values are designated with similar reference numerals or characters. The circuit of FIG. 7 includes a first constant voltage means comprising a transistor 81, a resistor 82, and a resistor 83 to utilize the transistors constant voltage characteristic. Therefore, when a variable resistor is employed as the resistor 83, or 82, to adjust the potential Vz, then the characteristics can be varied.

Further, a transistor 84 is a second constant voltage means in the voltage division circuit 47. A diode 85 is connected between the circuit point S in the voltage division circuit 47, formed with the first and second constant voltage means 81,84. An adjusting resistor 48 is connected in series with a capacitor 50. The diode 85 is used when it is required to make fine adjustments to the characteristic. Therefore, the diode 85 may be omitted from the circuit. The capacitor 50 is discharged periodically through a discharging transistor 52 from which circuit branch a protective resistor is omitted.

In place of the voltage comparison circuit 53 shown in FIG. 4, a transistor 86 is used. The transistor 86 is rendered conductive when the charge level of the capacitor 50 reaches the base-emitter voltage Vbe of the transistor 86. Thus, in this construction, the base-emitter voltage Vbe is the reference voltage E (Vbe=E). Until the capacitor 50 charges to the level E, the transistor 86 is non-conductive. The transistor 86 and a load resistor 87 in series thus form a switching circuit. The variation of the output pulse width of the transistor 86, due to variations of the base-emitter voltage Vbe attributable to temperature variations, coincides with the temperature characteristics for the time duration for application of current to the heat generating elements 60 when ambient temperature changes. Thus, temperature compensation is also performed. The circuit elements of FIG. 7 described to this point form a current-time application control circuit 90. Output of the current-time application control circuit 90 is applied through a buffer circuit 91 to AND gates 92 associated with each element 60.

The heat generating elements 60, incorporated in a heat generating head 61, are divided into two groups a,b which are arranged with an offset or stagger in the direction indicated by the arrow A, which represents movement of the heat generating head 61 during printing. Therefore, the maximum number of heat generating elements 60 which are simultaneously energized is four. Character signal generating units 93,94 respectively provide signals to the heat generating head 61 and in particular to group a of heat generating elements 60 and group b of heat generating elements 60 respectively.

In FIG. 7, an electric motor 95 mechanically drives the thermal printer and the motor 95 is adapted to move the heat generating head 61 in the direction A or to feed a sheet of paper for thermal printing thereon. The magnetic field of a permanent magnet 96 fixedly secured to a shaft of the motor 95 engages a magnetic head 97 including a coil to form a tachometer generator 98 which is adapted to detect the timing for printing with the groups a,b of heat generating unit 60. That is, the signals from the tachometer generator 98 are indicative of the lateral position of the heat generating head 61 relative to the printing paper. The tachometer generator 98 assures equal dot intervals on a printing sheet irrespective of the speed of the motor 95.

The output of the tachometer generator 98 is shaped into a timing signal by a timing signal generating unit 99, and the shaped signals applied to the discharging transistor 52, momentarily rendering the transistor 52 conductive so as to discharge the capacitor 50. The timing signal from the generator 99 is also input to the central processing unit 64. The tachometer generator 98 and the timing signal generating unit 99 form a position detector 100 which as stated, operates to indicate the lateral position of the heat generating head 61.

FIG. 8 indicates timing waveforms for the thermal printer drive circuit 90 in accordance with the invention shown in FIG. 7. The output waveform 101 of the tachometer generator 98 is a sine wave generated in the coil of the magnetic head 97 as the motor 95 rotates. The position detector circuit 100 outputs a series of pulses 102 at regular intervals when the motor rotational speed is uniform. There is one pulse 102 for each cycle of the output 101 regardless of the frequency of the sine wave. The pulse width of the signals 102 is very small, and the discharging transistor 52 is rendered conductive and non-conductive repeatedly in sychronization with the period of the tachometer generator 98. The width of the pulse 102 is sufficient to allow for discharge of the capacitor 50.

Assuming that the initial current application position is at $T_0$ (a) in FIG. 8, then after the timing signal of $T_0$ (b) printing is completed for one line, that is, for group b in FIG. 7. Thereafter, current is applied to the heater elements during a period to $T_1$ (a), $T_1$ (b), and so on, to form a character in a matrix having a vertical height of seven dots. The output signal 103 from the transistor 86 in the current-time application control circuit 90 to the buffer means 91 is indicated in FIG. 8, and the pulse width varies with the supply voltage Vc. When, as in the case of the timing $T_0$ (b), the number of heat generating elements energized is large and the voltage is reduced to a low value Vc1, then the pulse width t is increased to a large value Tw1. On the other hand, when the voltage Vc is increased to a high value Vc2, the pulse width t is diminished to a small value Tw2. The output waveform 103 and the signals from the character signal generating units 93,94 are combined through the AND gates 92 so as to select the groups a,b or heat generating element 60 and the individual heat generating elements 60, so as to form desired characters as the printing head 61 translates in the direction A across a printing paper.

In an alternative embodiment where the variations in the base-emitter voltage Vbe due to temperature changes are insufficient to compensate for the changes in the heat generating element 60, a temperature detecting element, such as a thermistor, is connected in series or in parallel with the adjusting resistor 48.

Whereas the thermal printer drive circuit in accordance with the invention has been described with reference to the embodiments shown in FIGS. 4 and 7, it should be noted that the invention is not so limited. That is, the invention covers all of the thermal printer drive circuits which operate by the same principles. For instance, the constant voltage means shown in FIGS. 4 and 7 may be replaced by a single diode or plural diode which are connected in series in accordance with the desired values of the voltage Vz, utilizing the forward characteristic of each diode.

Figure 9:
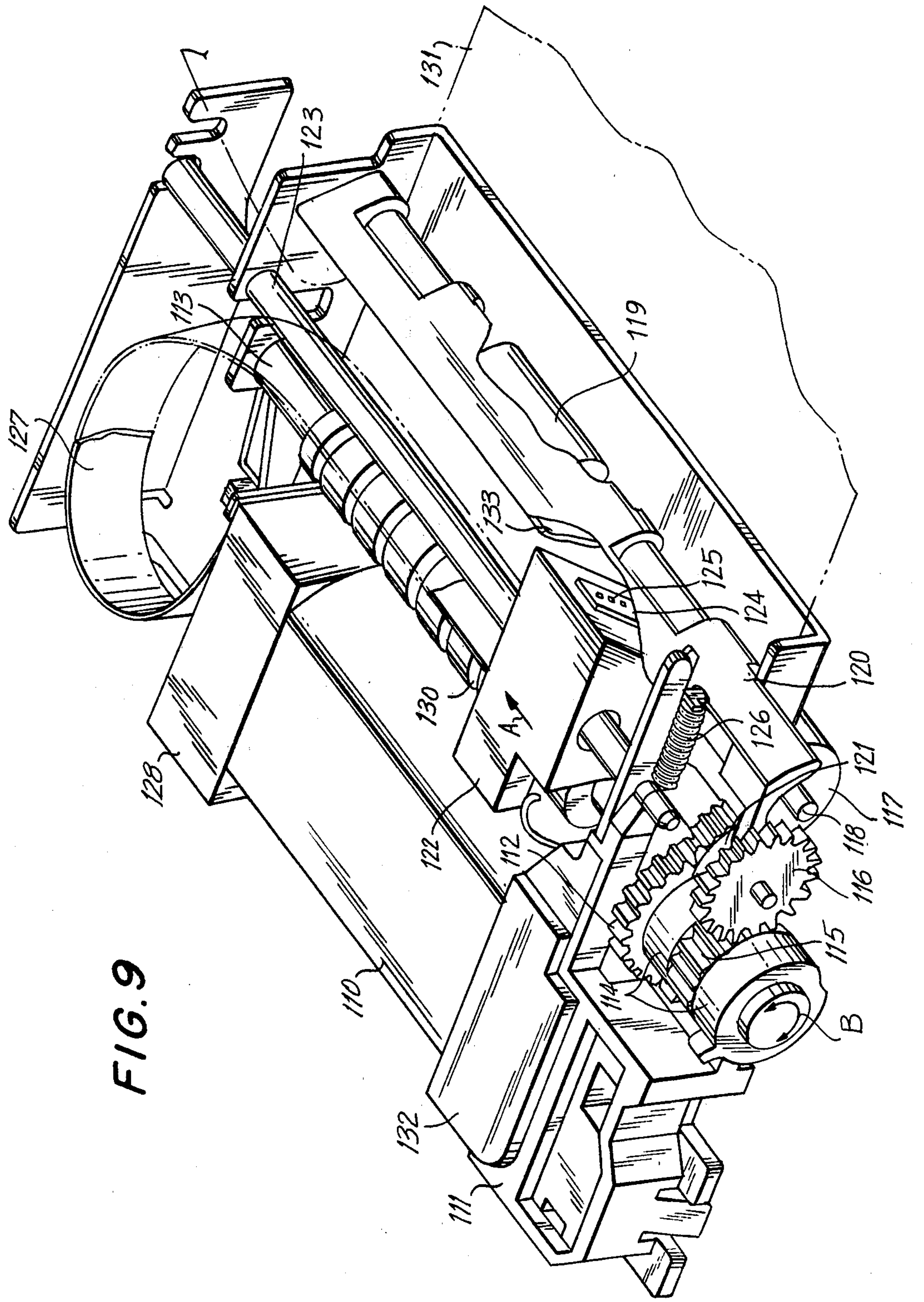
FIG. 9 is a top perspective view of a thermal printer using a thermal printer drive circuit in accordance with this invention.

FIG. 9 is a perspective view of a thermal printer to which the thermal printer drive circuit in accordance with the invention is applied. The drive source is an electric motor 110 which is rotated for motion of a carriage 122 in the direction of the arrow A for the printing operation, and is rotated in the opposite direction for the return motion of the carriage 122. A reduction gear housing 111 encloses a reduction gear (not shown) which is engaged with the motor 110. A cam gear 112 engages with the reduction gear and operates together with a head feed cam 113 which includes a groove cam 130. The groove cam 130 engages with the carriage 122 which fixedly supports a heat generating head 124 such that the head 124 reciprocates horizontally.

Further, the thermal printer of FIG. 9 includes a clutch ratchet wheel 114 and a clutch gear 115 respectively. By means of a clutch spring (not shown) incorporated in the clutch ratchet 114 and the clutch gear 115, one reciprocating rotary motion, indicated by the arrow B, is transmitted for each line of printing to a sheet feed transmission gear 116. A sheet feed 117, engaging with the incorporating clutch spring, transfers the rotation in one direction to a sheet feed roller shaft 118 and to a sheet feed roller 119 mounted on the sheet feed roller shaft 118 so as to feed a printing sheet 131 for every line of printing.

A platen lever 120 engages a cam 121 which is integral with the sheet feed transmission gear 116. The platen lever 120 is pushed against the carriage 122 by a platen spring 126 in the printing operation, and the lever 120 is released in the returning operation. A platen 133 is fixedly secured to the platen lever 120 and the carriage 122 is reciprocated along a guide shaft 123 by the head feed cam 113. The head 124, having heat generating elements 125 thereon is fixedly secured to the carriage 122 and moves therewith. An FPC 127, which is a flat conductor, is connected to the head 124 to provide drive signals for printing. A tachometer generator 128 engages with the motor 110 to detect the printing position of the carriage 122. Furthermore, a reset position detector 132 is provided to detect the start position for printing of the carriage 122. The thermal printer drive circuit in accordance with the invention is not only applicable to a thermal printer as shown in FIG. 9, but also has a wide range of applications.

Figure 10:
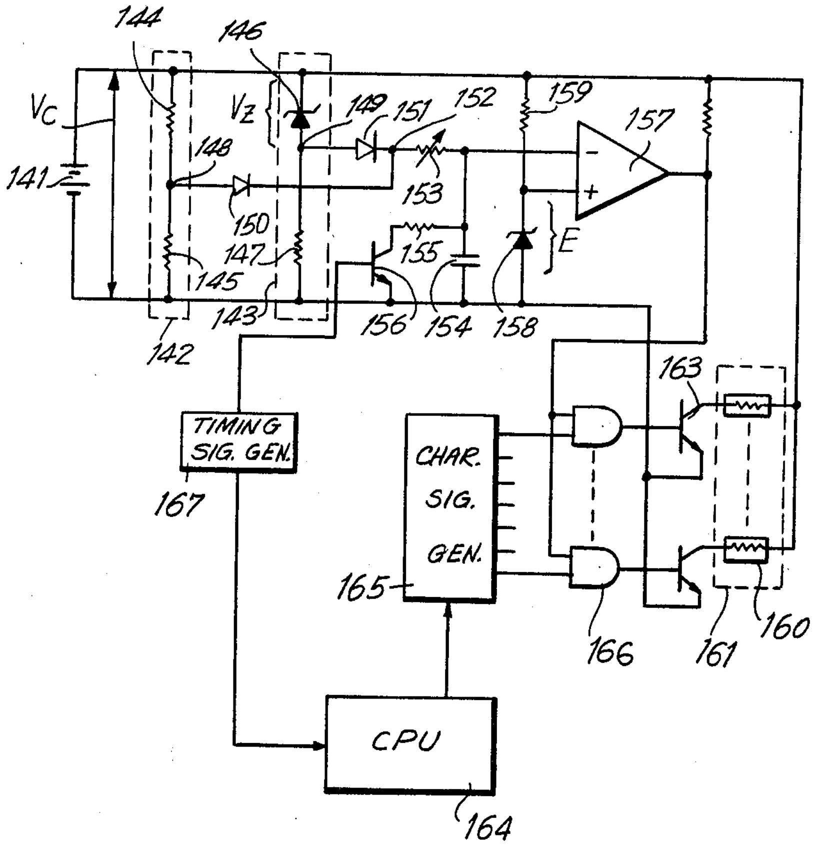
FIG. 10 is a circuit diagram of an alternative embodiment of a thermal printer drive circuit in accordance with this invention.

FIG. 10 is a schematic circuit diagram of an electronic desk calculator including another alternative embodiment of a thermal printer drive circuit in accordance with the invention. The thermal printer drive circuit includes a power source 141, namely, a battery, a first voltage division circuit 142 comprising resistors 144,145 in series across the voltage source 142. The circuit also includes a second voltage division circuit 143 including a Zener diode 146 which is a constant voltage device. The potential Vc of the power source 141 is divided in a predetermined ratio n and detected at a voltage division point 148.

The second voltage division circuit 143 utilizes the characteristic of the Zener diode 146. That is, at the voltage division point 149 of the second voltage division circuit 143, a voltage Vc−Vz is provided, where Vz is the constant voltage drop of the Zener diode. Diodes 150,151 connect to the voltage division points 148,149 respectively, and the first voltage division circuit 142 is coupled through the diodes 150,151 to the second voltage division circuit 143. An adjusting resistor 153 is joined to the connecting point 152 of the diodes 150,151, and a charging capacitor 154 connects between the adjusting resistor 153 and one terminal, that is, the negative terminal, of the power source 141.

The first voltage division circuit 142, the second voltage division circuit 143, the diodes 150,151, adjusting resistor 153 and the capacitor 154 form a charging circuit.

Further, a transistor 156 is connected through a resistor 155 across the capacitor 154 to control the charge and discharge of the capacitor 154. A voltage comparison circuit 157, a type of switching circuit, is turned ON and OFF in accordance with the level of charge as measured by voltage in the capacitor 154. That is, the output of the comparison circuit 157 changes when the capacitor voltage level climbs to a preselected level.

A reference voltage E is formed by a Zener diode 158, a constant voltage element, in series with a resistor 159 across the voltage source 141. The charge level of the capacitor 154 is compared with the reference voltage E by the voltage comparison circuit 157, and the output level of the comparison circuit 157 is determined and changed as a result of the comparison. More specifically, in FIG. 10, when the charge level, that is, the voltage on the charging capacitor 154 exceeds the reference voltage E, the output of the voltage comparison circuit 157 is set to a low logic level. The logic level out of the voltage comparison circuit 157 is high while the capacitor 154 is charging to the level E. With the aid of the circuit elements described to this point, the time t for current application for the thermal printer's heat generating elements 160 is determined in accordance with the supply voltage, and these circuits form a current-time application control circuit.

Further, in FIG. 10, the circuit includes heat generating elements 160 in a heat generating head 161 made of a ceramic material, or the like. In general, the heat generating elements 160 are aligned longitudinally on the heat generating head 161 so as to produce seven dots in a line by moving the head 161 laterally. Characters are formed with dots in a five by seven matrix. In this lateral motion, current application control means, in particular, transistors 163, operate to selectively control the application of current to the heat generating elements 160 as required to form the individual characters. A central processing unit 164 performs processing operations and controls the printer. A character signal generating unit 165 is coupled to the central processing unit 164.

Outputs of the character signal generating unit 165 and the output voltage of the comparison circuit 157 are applied to AND gates 166 selectively, as a result of which the transistors 163 are rendered conductive for a period of time which varies in accordance with the magnitude of the supply voltage Vc. Accordingly, printing is carried out with desirable density and quality.

A timing signal generating unit 167 operates to detect the position of the heat generating head 161 relative to the print paper and generates printing timing signals which render conductive the discharging transistor 156 momentarily. The discharging transistor 156 is conductive from several to several tens of micro-seconds.

Figure 11:
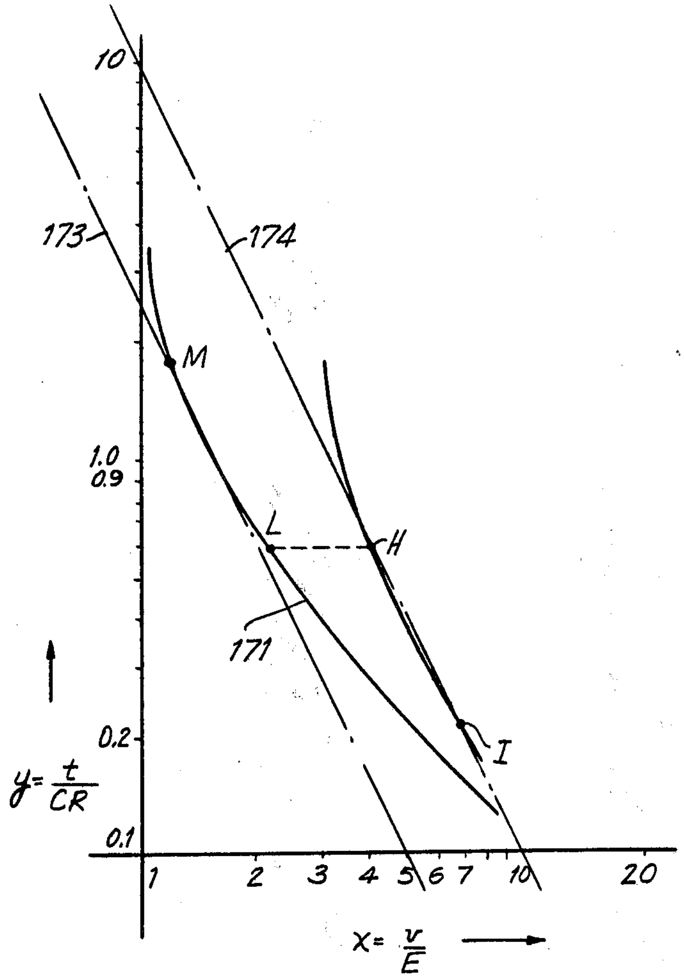
FIG. 11 is a graph of the performance characteristics of the thermal printer drive circuit of FIG. 10.

Operation of the current application time control for a thermal printer drive circuit in accordance with this invention is now described with reference to FIG. 11 which has scales similar to those log-log scales used in FIGS. 3 and 6. In FIG. 11, a characteristic performance curve 171 is the same as the characteristic curve of the prior art thermal printer drive circuit as shown in FIG. 3. The characteristic curve is represented by the following expression (8):

$$y = t/C \cdot R = -\ln(1 - E/v) \ldots \quad (8)$$

where C is the capacitance of the capacitor 154, and R is the resistance of the adjusting resistor 153. The characteristic curve 171 is obtained by graphing the equation (5) with x=v/E.

The characteristics of the first voltage division circuit 142 can be at any point on the characteristic curve 171 when a value n is selected in the expression v=nVc. The value t is the product of y times C·R, the time constant, and t represents the period of time for which the transistor 163 is rendered conductive to drive the printing elements 160.

In FIG. 11, a characteristic curve 172 is obtained when only the second voltage division circuit 143 is considered. As the charge potential of the second voltage division circuit 143 can be represented by v=Vc−Vz, the value t is represented by the following expression (9):

$$y = t/C \cdot R = -\ln\left(1 - \frac{E}{Vc - Vz}\right) \quad (9)$$

The characteristic curve 172 is obtained by graphing, for example, with Vz=Ex 1.8 volts, and x=Vc/E. Straight lines 173,174 in FIG. 11 have a slope of −2, that is, these lines represent the constant power/constant temperature characteristic. A voltage drop caused by the diodes 150,151 can be disregarded theoretically, however, in practice a small correction should be made for these elements.

The range of the characteristic curve 172 which approximates the straight line having the slope of −2 is much wider than that corresponding portion for the characteristic curve 171. More specifically, the portion of the characteristic curve 172 which is between the point I and the point H, corresponding to x in a range of 4.4 to 7, can approximate the desired straight line. Thereafter, as the voltage Vc decreases, the value y tends to increase abruptly. Therefore, the time during which current is applied is increased and accordingly printing energy becomes excessive.

This is exemplified when different battery voltages are considered. When E=0.9 volts, then Vc equals 4.0 to 6.3 volts. Therefore, when using a manganese dry cell drive, the range of voltage is rather small. Furthermore, as the voltage further decreases, the print density is increased, that is, the dot density variation is increased. This drawback is eliminated by operating the first voltage division circuit 142 simultaneously with the second voltage division circuit 143.

The potential of the first voltage division circuit 142 can be represented by n·Vc. Assume that the initial battery voltage Vc is defined by Vc−Vz>n·Vc. In this case, the values Vz and n can be set so as to satisfy Vc−Vz=n·Vc as the voltage Vc decreases gradually, and satisfy Vc−Vz<n·Vc when the voltage Vc decreases further.

For instance, if it is assumed that when Vc is four volts with E at 0.9 volts and Vz at 1.6 volts, the potential at the voltage division point of the first voltage division circuit 142 is equal to the potential at the voltage division point of the second voltage division circuit 143, then n can be set to 0.6.

When the supply voltage decreases below 4.0 volts, then the potential of the voltage division point 148 of the first voltage division circuit 142 becomes higher than the voltage at the voltage division point 149 of the second voltage division circuit 143. Therefore, in the case where Vc is 4.0 volts or less, the locus from the point L to approximately the point M of the characteristic curve 171 is traced. Above 4.0 volts of Vc, the curve 172 is traced as a result of the diodes 150,151. Accordingly, the conventional constant power/constant temperature characteristic 171 is utilized as it is only in the low voltage range, and the range of voltage for equal energy/temperature printing is greatly increased. A characteristic where the energy decreases with decreasing potential is provided depending on selection of the values Vz and n. Accordingly, the user of the electronic desk calculator can visually detect a decreased voltage supply value from the diminished print density and can prevent the problem where the calculator actually becomes inoperable during the printing operation.

Thus, as described above, the thermal printer drive circuit in accordance with the invention drives a thermal printer with a power source such as a manganese dry cell having a wide range of voltage output, and efficiently uses the capacity of the dry cell.

Figure 12:
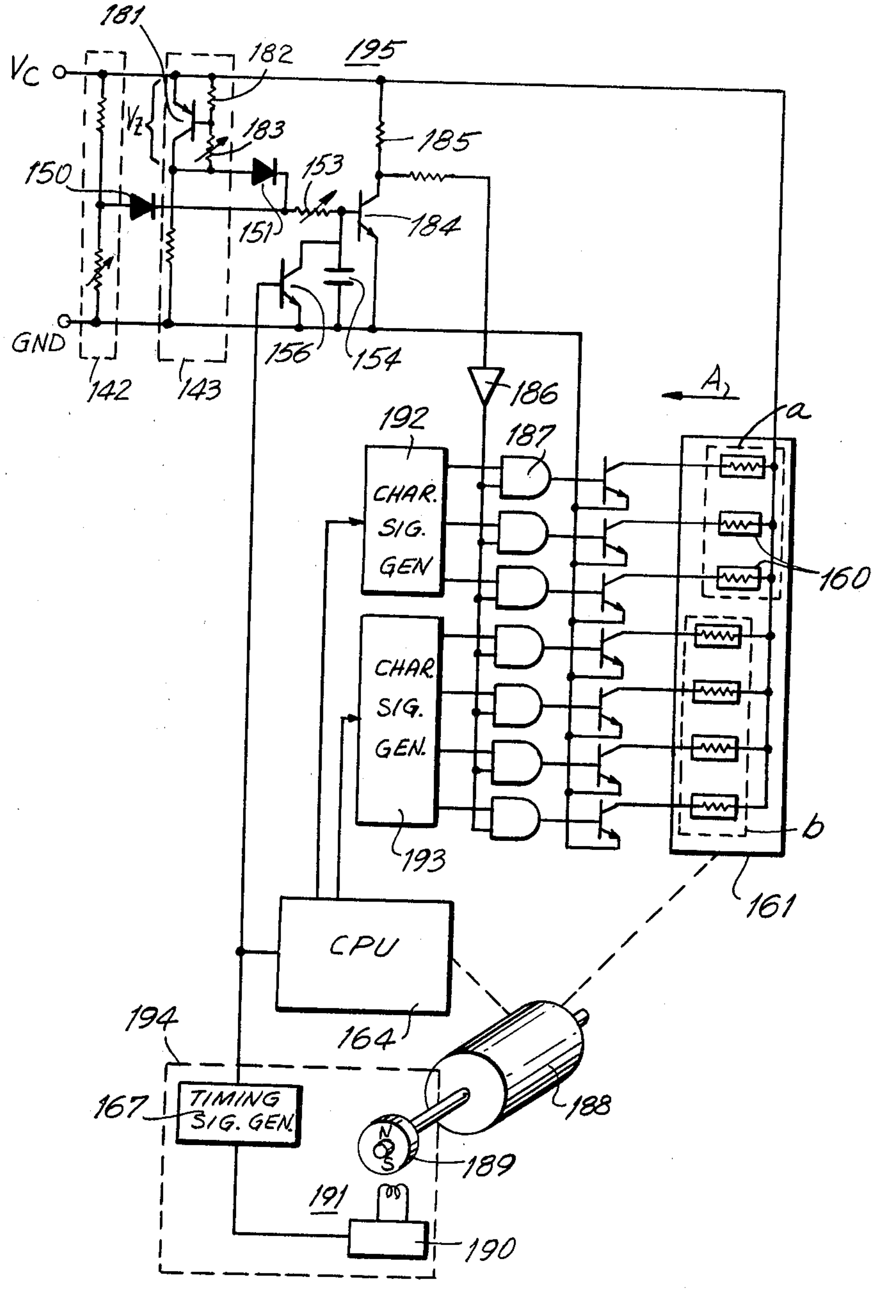
FIG. 12 is a circuit of another alternative embodiment of a thermal printer drive circuit in accordance with the invention.

FIG. 12 is a circuit diagram of an alternative embodiment of a thermal printer drive circuit in accordance with the invention. In FIGS. 10 and 12, like components and values are designated with similar reference numerals or characters. A first voltage division circuit 142 (FIG. 12) is identical to that of FIG. 10 and needs no further description here. A second voltage division circuit 143 includes a transistor 181 and resistors 182 and 183, utilizing the constant voltage characteristic of the transistor 181 to provide a constant voltage means. Therefore, when a variable resistor 183, or 182, is used, the value of voltage Vz across the transistor 181 can be adjusted and the characteristic of the circuit is changed.

The switching circuit, which is turned ON and OFF in accordance with the charge of a capacitor 154 is simple in construction, being comprised of a transistor 184 in series with a load resistor 185 across the power supply. A waveform shaping buffer circuit 186 transmits the output of the drive circuit to AND gates 187 associated with each printing element 160. In this construction, the reference voltage E is the base-emitter voltage Vbe of the transistor 184, and it is, in general, of the order of 0.7 volts. The temperature characteristics of the base-emitter voltage coincide with the temperature characteristics affecting current application time requirements for the heat generating elements 160. Thus, temperature compensation is also performed. More specifically, at a low temperature, the base-emitter voltage increases and therefore the time required for charging the capacitor 154 increases. On the other hand, when the ambient temperature is high, the current application time is decreased. Thus, in either case, suitable printing quality is obtained. The circuit elements described heretofore with respect to FIG. 12 form a current-time application control circuit 195. As in the circuit of FIG. 10,11 the characteristics of both voltage division circuits provide constant heater temperature in adjoining ranges of battery voltage respectively.

The heat generating elements 160 are divided into two groups a,b, as described before, which are arranged in a staggered fashion in the direction of carriage movement A, such that the maximum number of heat generating elements 160 energized simultaneously, that is, the maximum number of simultaneously printed dots, is four. Character signal generating units 192,193 drive the groups a,b of heat generating elements 160, respectively. Further, in FIG. 12, the circuit includes a drive source 188 for the thermal printer, namely, an electric motor which is adapted to operate so as to move the heat generating head 161 in the direction A for printing, and to operate a sheet feeding unit (not shown). The circuit also includes a permanent magnet 189, fixedly secured and rotating with the shaft of the electric motor 188 in association with a magnetic head 190 including a coil which detects the field of the magnet 189 so as to form a tachometer generator 191. The tachometer generator produces waveforms used for detecting the position of the heat generating elements 160 in the groups a,b and thereby to provide timing signals as previously described and illustrated. Provision of the tachometer generator 191 assures equal dot intervals on the printing sheet (not shown) regardless of the speed of the motor 188. The output of the tachometer 199 is converted into a waveform for rendering the discharging transistor 156 associated with the capacitor 154 momentarily conductive by means of a timing signal generating unit 167. The output of the timing signal generating unit 167 is also applied to a central processing unit 164. The tachometer generating unit 191 and the timing signal generating unit 167 form a position detector 194 adapted to detect printing position.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A drive circuit for a thermal printer for printing characters on a printing sheet by selectively applying current to a plurality of heat generating elements, comprising:

current application control means for selectively controlling the application of current to said heat generating elements;

a power source supplying said current to said current application control means and to said heat generating elements;

time control means for varying the active operational period of time of said current application control means for energizing said heat generating elements, said time control means including:

a charging circuit having at least a first constant voltage means, a first resistor and a capacitor in series between the terminals of said power source; a discharging circuit connected in parallel with at least said capacitor of said charging circuit; and switching means adapted to be ON or OFF according to a selected charge level of said capacitor, said switching means when ON enabling said current application control means to apply current to said heat generating elements, said switching means, when OFF, preventing said current application control means from applying current to said heat generating elements, the time required for said capacitor to charge to said selected level varying inversely with the voltage level of said power source, the temperature of said heat generating elements, when energized, being constant over a wide range of voltages of said power source.

2. A drive circuit as claimed in claim 1, and further comprising a second constant voltage means and a second resistor, said first constant voltage means, and said second constant voltage means, and said second resistor being in series across said power source forming a first voltage division circuit for dividing the voltage of said power source, said capacitor being connected between one terminal of said power source and an intermediate point in said voltage division circuit to comprise said charging circuit.

3. A drive circuit as claimed in claim 2, wherein said second constant voltage means is one of a transistor, said transistor emitter-collector terminals being in said series of said first voltage division circuit, and a diode.

4. A drive circuit as claimed in claim 2, wherein said first and second constant voltage means are transistors with the emitter-collector terminals in series.

5. A drive circuit as claimed in claim 1, and further comprising a second resistor, said first constant voltage means and said second resistor being in series across said power source forming a force voltage division circuit for dividing the voltage of said power source, said capacitor being connected between one terminal of said power source and an intermediate point in said voltage division circuit to comprise said charging circuit.

6. A drive circuit as claimed in claim 2 or 5, and further comprising a second voltage division circuit comprised of series resistors across said power source for providing voltage division, a point in said second voltage division circuit being connected to said intermediate point of said first voltage division circuit.

7. A drive circuit as claimed in claim 6, and further comprising means for translating said heat generating elements relative to a printing medium, and a position detector for detecting print positions in association with said movement, said discharging circuit being adapted to operate in synchronization with an output of said position detector.

8. A drive circuit as claimed in claim 6, and further comprising a pair of diodes in said connection between said first and second voltage division circuits, said capacitor being adapted to charge through a portion of either said voltage division circuits, said capacitor charging through said first voltage division circuit portion when said source voltage is above a selected value and through said second voltage division circuit when said source voltage is below said selected source level, the state of said diode pair in said connection between said voltage division circuits determining the current path for charging said capacitor.

9. A drive circuit as claimed in claim 1,2, or 5, and further comprising means for translating said heat generating elements relative to a printing medium, and a position detector for detecting print positions in association with said movement, said discharging circuit being adapted to operate in synchronization with an output of said position detector.

10. A drive circuit as claimed in claim 2 or 5, wherein said constant voltage means is one of a Zener diode and a transistor having emitter-collector terminals in said charging circuit.

11. A drive circuit as claimed in claim 1, wherein said switching means includes a comparator and a third constant voltage source, said comparator comparing the voltage level on said charging capacitor with said third constant voltage source.

12. A drive circuit as claimed in claim 11, wherein said current application control means includes a gate and a transistor, said current to said heat generating elements passing through said transistor, said transistor being enabled by said gate output, said gate input being the output of said comparator means.

13. A drive circuit as claimed in claim 1, wherein said switching means is a transistor, the base of said transistor sensing the voltage level of said charging capacitor, said transistor being triggered into conduction at said selected charge level of said capacitor.

* * * * *